US012572732B2

(12) United States Patent
Aberbach et al.

(10) Patent No.: US 12,572,732 B2
(45) Date of Patent: Mar. 10, 2026

(54) TABLE CELL SPLITTING IN AN ONLINE DOCUMENT EDITOR

(71) Applicant: GOOGLE LLC, Mountain View, CA (US)

(72) Inventors: Tomer Aberbach, Hoboken, NJ (US); Gregory George Galante, Little Silver, NJ (US)

(73) Assignee: GOOGLE LLC, Mountain View, CA (US)

( * ) Notice: Subject to any disclaimer, the term of this patent is extended or adjusted under 35 U.S.C. 154(b) by 645 days.

(21) Appl. No.: 17/960,676

(22) Filed: Oct. 5, 2022

(65) Prior Publication Data

US 2024/0119224 A1     Apr. 11, 2024

(51) Int. Cl.
*G06F 40/177* (2020.01)
(52) U.S. Cl.
CPC .................................. *G06F 40/177* (2020.01)
(58) Field of Classification Search
None
See application file for complete search history.

(56) References Cited

U.S. PATENT DOCUMENTS

| | | | | |
|---|---|---|---|---|
| 8,621,340 | B2 * | 12/2013 | Chirilov | G06F 40/18 |
| | | | | 715/219 |
| 10,013,413 | B2 * | 7/2018 | Otero | G06F 40/174 |
| 10,331,767 | B1 * | 6/2019 | Galante | H04L 67/10 |
| 11,227,105 | B1 | 1/2022 | Samadani | |
| 2005/0044486 | A1 | 2/2005 | Kotler et al. | |
| 2006/0136807 | A1 * | 6/2006 | Yalovsky | G06F 40/177 |
| | | | | 715/256 |
| 2009/0319542 | A1 * | 12/2009 | Le Brazidec | G06F 40/18 |
| 2014/0189482 | A1 * | 7/2014 | Hill | G06F 40/18 |
| | | | | 715/212 |
| 2014/0250359 | A1 * | 9/2014 | Williams | G06F 40/103 |
| | | | | 715/227 |
| 2022/0164526 | A1 * | 5/2022 | Samadani | G06F 3/0486 |
| 2023/0214586 | A1 * | 7/2023 | Hudock | G06F 40/186 |
| | | | | 715/212 |

FOREIGN PATENT DOCUMENTS

| | | |
|---|---|---|
| CN | 106156761 | 11/2016 |
| CN | 112861481 | 5/2021 |

OTHER PUBLICATIONS

Anonymous; "Merge or split cells in a table"; Retrieved from the Internet: URL:https://web.archive.org/web/20221003005746/https://support.microsoft.com/en-us/office/merge-or-split-cells-in-a-table-8b458deb-0fc5-4c8d-8d94-2d4da98193f8; retrieved on Jan. 19, 2024; 3 pages; dated Oct. 3, 2022.

European Patent Office; International Search Report and Written Opinion issued in Application No. PCT/US2023/034397; 10 pages; dated Jan. 31, 2024.

* cited by examiner

*Primary Examiner* — Howard Cortes

(74) *Attorney, Agent, or Firm* — Gray Ice Higdon

(57) ABSTRACT

Techniques are described herein for table cell splitting in an online document editor. A method includes: responsive to a request to split a cell in a table, determining a target number of rows and a target number of columns, automatically inserting rows adjacent to rows of the cell to reach the target number of rows, automatically inserting columns adjacent to columns of the cell to reach the target number of columns, and automatically merging groups of cells within an initial boundary of the cell, each group spanning a determined number of rows per group and a determined number of columns per group.

20 Claims, 7 Drawing Sheets

300-1

100

200

---

205
RECEIVE, VIA A USER INTERFACE, A REQUEST TO SPLIT A CELL IN A TABLE IN A DOCUMENT IN A DOCUMENT EDITING APPLICATION, THE REQUEST IDENTIFYING THE CELL, A NUMBER OF VERTICAL CELLS INTO WHICH THE CELL IS TO BE SPLIT, AND A NUMBER OF HORIZONTAL CELLS INTO WHICH THE CELL IS TO BE SPLIT

---

210
DETERMINE A TARGET NUMBER OF ROWS BASED ON THE NUMBER OF VERTICAL CELLS INTO WHICH THE CELL IS TO BE SPLIT AND A ROW SPAN OF THE CELL

---

215
DETERMINE A TARGET NUMBER OF COLUMNS BASED ON THE NUMBER OF HORIZONTAL CELLS INTO WHICH THE CELL IS TO BE SPLIT AND A COLUMN SPAN OF THE CELL

---

220
IDENTIFY A PLURALITY OF AFFECTED CELLS INCLUDING CELLS THAT SPAN COLUMNS SPANNED BY THE CELL AND CELLS THAT SPAN ROWS SPANNED BY THE CELL

---

225
FOR EACH ROW SPANNED BY THE CELL, DETERMINE A HEIGHT OF THE ROW, AND FOR EACH COLUMN SPANNED BY THE CELL, DETERMINE A WIDTH OF THE COLUMN

---

230
UNMERGE ANY HEAD CELLS INCLUDED IN THE PLURALITY OF AFFECTED CELLS

---

235
DETERMINE WHETHER OR NOT THE CELL IS A HEAD CELL, AND IN RESPONSE TO DETERMINING THAT THE CELL IS A HEAD CELL, UNMERGE THE CELL

---

240
DETERMINE A ROW FACTOR BY DIVIDING THE TARGET NUMBER OF ROWS BY THE ROW SPAN OF THE CELL

---

245
FOR EACH ROW SPANNED BY THE CELL, DETERMINE AN UPDATED ROW HEIGHT BY DIVIDING A HEIGHT OF THE ROW BY THE ROW FACTOR, AND THEN SETS THE HEIGHT OF THE ROW BASED ON THE UPDATED ROW HEIGHT

---

TO BLOCK 250 IN
FIG. 2B

Fig. 2A

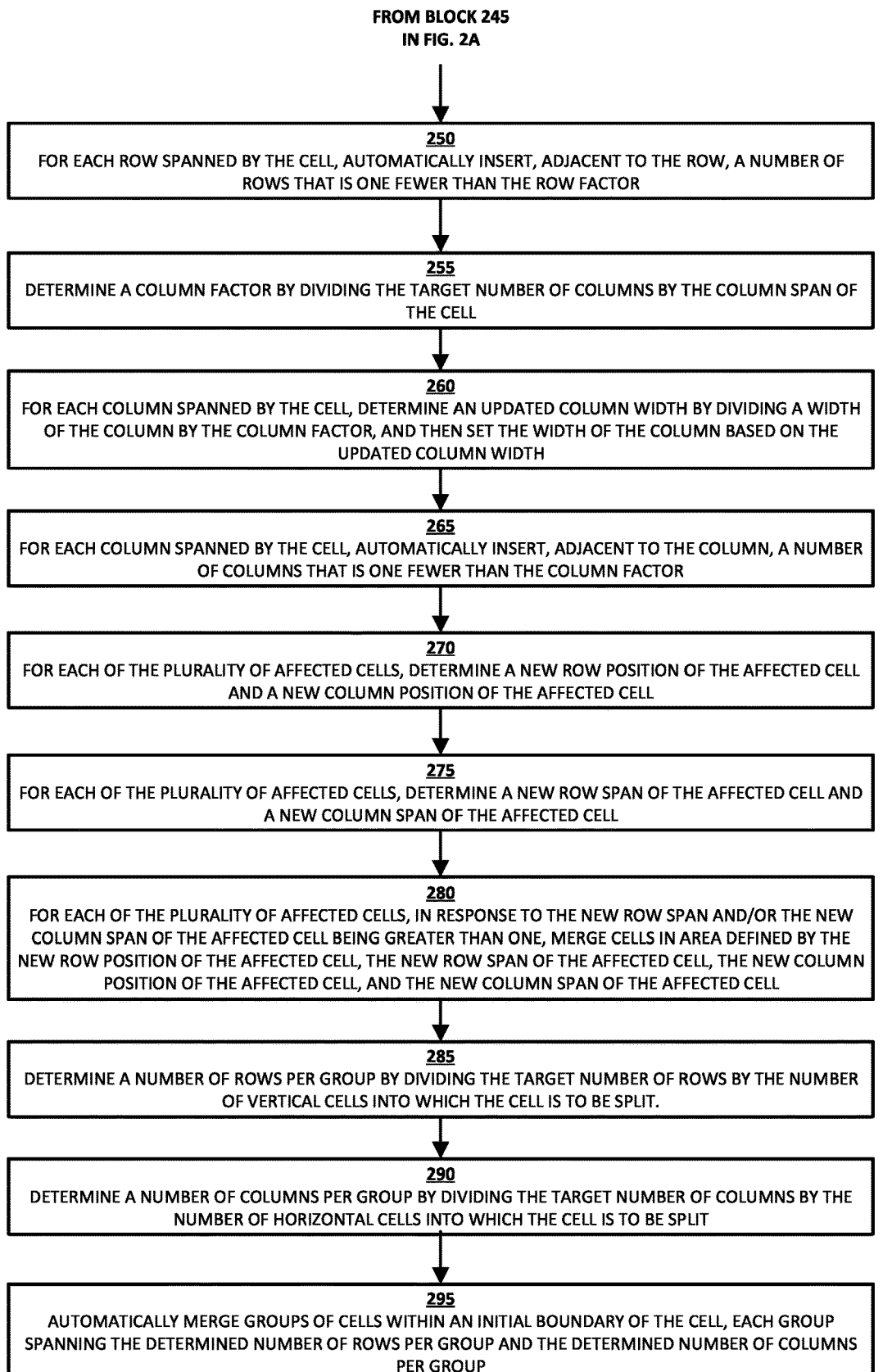

FROM BLOCK 245
IN FIG. 2A

250
FOR EACH ROW SPANNED BY THE CELL, AUTOMATICALLY INSERT, ADJACENT TO THE ROW, A NUMBER OF ROWS THAT IS ONE FEWER THAN THE ROW FACTOR

255
DETERMINE A COLUMN FACTOR BY DIVIDING THE TARGET NUMBER OF COLUMNS BY THE COLUMN SPAN OF THE CELL

260
FOR EACH COLUMN SPANNED BY THE CELL, DETERMINE AN UPDATED COLUMN WIDTH BY DIVIDING A WIDTH OF THE COLUMN BY THE COLUMN FACTOR, AND THEN SET THE WIDTH OF THE COLUMN BASED ON THE UPDATED COLUMN WIDTH

265
FOR EACH COLUMN SPANNED BY THE CELL, AUTOMATICALLY INSERT, ADJACENT TO THE COLUMN, A NUMBER OF COLUMNS THAT IS ONE FEWER THAN THE COLUMN FACTOR

270
FOR EACH OF THE PLURALITY OF AFFECTED CELLS, DETERMINE A NEW ROW POSITION OF THE AFFECTED CELL AND A NEW COLUMN POSITION OF THE AFFECTED CELL

275
FOR EACH OF THE PLURALITY OF AFFECTED CELLS, DETERMINE A NEW ROW SPAN OF THE AFFECTED CELL AND A NEW COLUMN SPAN OF THE AFFECTED CELL

280
FOR EACH OF THE PLURALITY OF AFFECTED CELLS, IN RESPONSE TO THE NEW ROW SPAN AND/OR THE NEW COLUMN SPAN OF THE AFFECTED CELL BEING GREATER THAN ONE, MERGE CELLS IN AREA DEFINED BY THE NEW ROW POSITION OF THE AFFECTED CELL, THE NEW ROW SPAN OF THE AFFECTED CELL, THE NEW COLUMN POSITION OF THE AFFECTED CELL, AND THE NEW COLUMN SPAN OF THE AFFECTED CELL

285
DETERMINE A NUMBER OF ROWS PER GROUP BY DIVIDING THE TARGET NUMBER OF ROWS BY THE NUMBER OF VERTICAL CELLS INTO WHICH THE CELL IS TO BE SPLIT.

290
DETERMINE A NUMBER OF COLUMNS PER GROUP BY DIVIDING THE TARGET NUMBER OF COLUMNS BY THE NUMBER OF HORIZONTAL CELLS INTO WHICH THE CELL IS TO BE SPLIT

295
AUTOMATICALLY MERGE GROUPS OF CELLS WITHIN AN INITIAL BOUNDARY OF THE CELL, EACH GROUP SPANNING THE DETERMINED NUMBER OF ROWS PER GROUP AND THE DETERMINED NUMBER OF COLUMNS PER GROUP

| | | Italicized text | | | | |
|---|---|---|---|---|---|---|
| | | | | Cell to split | | |
| | | | | | | |
| | Large font | | | | | |
| | | | | | | |
| | | | | Some text | | |
| | | | | | | |

Fig. 3C 300-4

| | | Italicized text | | | | |
|---|---|---|---|---|---|---|
| | | | | Cell to split | | |
| | | | | | | |
| | Large font | | | | | |
| | | | | | | |
| | | | | Some text | | |
| | | | | | | |

Fig. 3D 300-5

| | | *Italicized text* | | | |
| | | | | Cell to split | | |
| | | | | | | |
| | Large font | | | | | |
| | | | | | | |
| | | | | Some text | | |
| | | | | | | |

Fig. 3E

TABLE CELL SPLITTING IN AN ONLINE DOCUMENT EDITOR

BACKGROUND

Online document editors (e.g., text editors) may allow multiple users to collaboratively create, view, and edit documents. For example, an online text editor may allow users who are members of a particular team within a company or other organization to collaborate on a particular document by making edits (e.g., revisions) to the document in a synchronous manner and/or in an asynchronous manner.

Online document editors may support various formatting within documents that are created, viewed, and edited. This formatting may include character formatting (e.g., typeface, size, color, etc.) and paragraph formatting (e.g., indentation, alignment, line spacing, etc.). Online document editors may also support creating and editing tables that include cells arranged in one or more columns and one or more rows. Each cell in a table may contain text, images, and/or other content. Each cell in a table may also include formatting (e.g., character formatting applied to characters in the cell, a background color, alignment of content with the cell, etc.).

An online document editor may support merging two or more cells in a table into a single cell. However, splitting a cell in a table into two or more cells may not be supported by an online document editor, or may require introducing new storage and layout primitives for "split cells". However, that approach has a high engineering burden for the initial design and implementation of storage and layout as well as an ongoing engineering burden for any future table related features, which now have to consider split cells in their algorithms. The engineering burden may include computational resources that must be utilized in initial and ongoing design and maintenance.

Additionally, the complexity of code for an online document editor may be increased by the addition of new storage and layout primitives for split cells, as a result of adding code to handle display and editing operations on the new storage and layout primitives for split cells. For example, in a case where new storage and layout primitives are added for split cells, additional code may be added in the implementation of a merge operation, to account for merging split cells. This added code and complexity may be problematic as it may increase the resource requirements (e.g., processor and/or memory requirements) of the online document editor.

For an online document editor, it may be desirable and/or required to keep the editor simple and/or within bounds of certain resource requirements (e.g., processor and/or memory requirements). For example, it may desirable to keep the processor and/or memory requirements for an online document editor to a minimum, or below a particular threshold, to ensure loading and/or interaction with editor occurs with reduced latency and/or to ensure loading and/or interaction is performable across a wide variety of document editing applications and/or client devices. Accordingly, adding new storage and layout primitives for split cells may be problematic due to the associated increase in computational resources used by an online document editor.

SUMMARY

Techniques described herein relate to table cell splitting in an online document editor. Implementations may implement table cell splitting at a controller level, using existing storage and layout primitives for rows, columns, normal cells, and merged cells. By avoiding the introduction of new storage and layout primitives, implementations may have a fixed engineering burden, as implementations may not affect future table related features by complicating an online document editor's table domain model. Accordingly, implementations may provide for more efficient use of computational resources in initial and ongoing design and maintenance. Additionally, implementations may minimize any increase in complexity in the code of an online document editor, thereby minimizing any impact to computational resources used by an online document editor.

Implementations disclosed herein may keep an online document editor simple and/or within bounds of certain resource requirements while still providing cell splitting functionality that enables complex cell splitting operations to be performed in response to limited user input. For example, a cell splitting operation may be performed in response to a single tap of a user, or in response to two taps (e.g., a menu is brought up with a first tap, and a menu item is selected from the menu with a second tap).

In various implementations, responsive to a request to split a cell in a table, the system may determine a target number of rows and a target number of columns, automatically insert rows adjacent to rows of the cell to reach the target number of rows, automatically insert columns adjacent to columns of the cell to reach the target number of columns, and automatically merge groups of cells within an initial boundary of the cell, each group spanning a determined number of rows per group and a determined number of columns per group.

In various implementations, a method implemented by one or more processors may include: receiving, via a user interface, a request to split a cell in a table in a document in a document editing application, the request identifying the cell, a number of vertical cells into which the cell is to be split, and a number of horizontal cells into which the cell is to be split; determining a target number of rows based on the number of vertical cells into which the cell is to be split and a row span of the cell; determining a target number of columns based on the number of horizontal cells into which the cell is to be split and a column span of the cell; determining a row factor by dividing the target number of rows by the row span of the cell; for each row spanned by the cell, automatically inserting, adjacent to the row, a number of rows that is one fewer than the row factor; determining a column factor by dividing the target number of columns by the column span of the cell; for each column spanned by the cell, automatically inserting, adjacent to the column, a number of columns that is one fewer than the column factor; determining a number of rows per group by dividing the target number of rows by the number of vertical cells into which the cell is to be split; determining a number of columns per group by dividing the target number of columns by the number of horizontal cells into which the cell is to be split; and automatically merging groups of cells within an initial boundary of the cell, each group spanning the determined number of rows per group and the determined number of columns per group.

In some implementations, determining the target number of rows includes determining a least common multiple of the number of vertical cells into which the cell is to be split and the row span of the cell; and determining the target number of columns includes determining a least common multiple of the number of horizontal cells into which the cell is to be split and the column span of the cell.

In some implementations, automatically inserting, adjacent to the row, the number of rows that is one fewer than the row factor includes automatically inserting, below the row, the number of rows that is one fewer than the row factor, using the row as a reference row. In some implementations, automatically inserting, adjacent to the column, the number of columns that is one fewer than the column factor includes automatically inserting, to a left of the column, the number of columns that is one fewer than the column factor, using the column as a reference column.

In some implementations, the method further includes: for each row spanned by the cell: determining an updated row height by dividing a height of the row by the row factor; and setting the height of the row based on the updated row height, prior to automatically inserting, adjacent to the row, the number of rows that is one fewer than the row factor; and for each column spanned by the cell: determining an updated column width by dividing a width of the column by the column factor; and setting the width of the column based on the updated column width, prior to automatically inserting, adjacent to the column, the number of columns that is one fewer than the column factor.

In some implementations, the method further includes: determining that the cell is a head cell; and unmerging the cell, prior to automatically inserting the number of rows that is one fewer than the row factor and prior to automatically inserting the number of columns that is one fewer than the column factor.

In some implementations, the method further includes: identifying a plurality of affected cells including cells that span columns spanned by the cell and cells that span rows spanned by the cell; unmerging any head cells included in the plurality of affected cells, prior to automatically inserting the number of rows that is one fewer than the row factor and prior to automatically inserting the number of columns that is one fewer than the column factor; for each of the plurality of affected cells: determining a new row position of the affected cell and a new column position of the affected cell; determining a new row span of the affected cell and a new column span of the affected cell; and in response to the new row span of the affected cell and/or the new column span of the affected cell being greater than one, merging cells in an area defined by the new row position of the affected cell, the new row span of the affected cell, the new column position of the affected cell, and the new column span of the affected cell.

In some additional or alternative implementations, a computer program product may include one or more computer-readable storage media having program instructions collectively stored on the one or more computer-readable storage media. The program instructions may be executable to: receive, via a user interface, a request to split a cell in a table in a document in a document editing application, the request identifying the cell, a number of vertical cells into which the cell is to be split, and a number of horizontal cells into which the cell is to be split; determine a target number of rows based on the number of vertical cells into which the cell is to be split and a row span of the cell; determine a target number of columns based on the number of horizontal cells into which the cell is to be split and a column span of the cell; determine a row factor by dividing the target number of rows by the row span of the cell; for each row spanned by the cell, automatically insert, adjacent to the row, a number of rows that is one fewer than the row factor; determine a column factor by dividing the target number of columns by the column span of the cell; for each column spanned by the cell, automatically insert, adjacent to the column, a number of columns that is one fewer than the column factor; determine a number of rows per group by dividing the target number of rows by the number of vertical cells into which the cell is to be split; determine a number of columns per group by dividing the target number of columns by the number of horizontal cells into which the cell is to be split; and automatically merge groups of cells within an initial boundary of the cell, each group spanning the determined number of rows per group and the determined number of columns per group.

In some additional or alternative implementations, a system may include a processor, a computer-readable memory, one or more computer-readable storage media, and program instructions collectively stored on the one or more computer-readable storage media. The program instructions may be executable to: receive, via a user interface, a request to split a cell in a table in a document in a document editing application, the request identifying the cell, a number of vertical cells into which the cell is to be split, and a number of horizontal cells into which the cell is to be split; determine a target number of rows based on the number of vertical cells into which the cell is to be split and a row span of the cell; determine a target number of columns based on the number of horizontal cells into which the cell is to be split and a column span of the cell; determine a row factor by dividing the target number of rows by the row span of the cell; for each row spanned by the cell, automatically insert, adjacent to the row, a number of rows that is one fewer than the row factor; determine a column factor by dividing the target number of columns by the column span of the cell; for each column spanned by the cell, automatically insert, adjacent to the column, a number of columns that is one fewer than the column factor; determine a number of rows per group by dividing the target number of rows by the number of vertical cells into which the cell is to be split; determine a number of columns per group by dividing the target number of columns by the number of horizontal cells into which the cell is to be split; and automatically merge groups of cells within an initial boundary of the cell, each group spanning the determined number of rows per group and the determined number of columns per group.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include a client device that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

BRIEF DESCRIPTION OF THE DRAWINGS

FIGS. 2A and 2B depict flowcharts illustrating an example method of table cell splitting in an online document editor.

FIG. 3A, FIG. 3B, FIG. 3C, FIG. 3D, and FIG. 3E depict an example application of techniques described herein, in accordance with various implementations.

DETAILED DESCRIPTION

Figure 1:
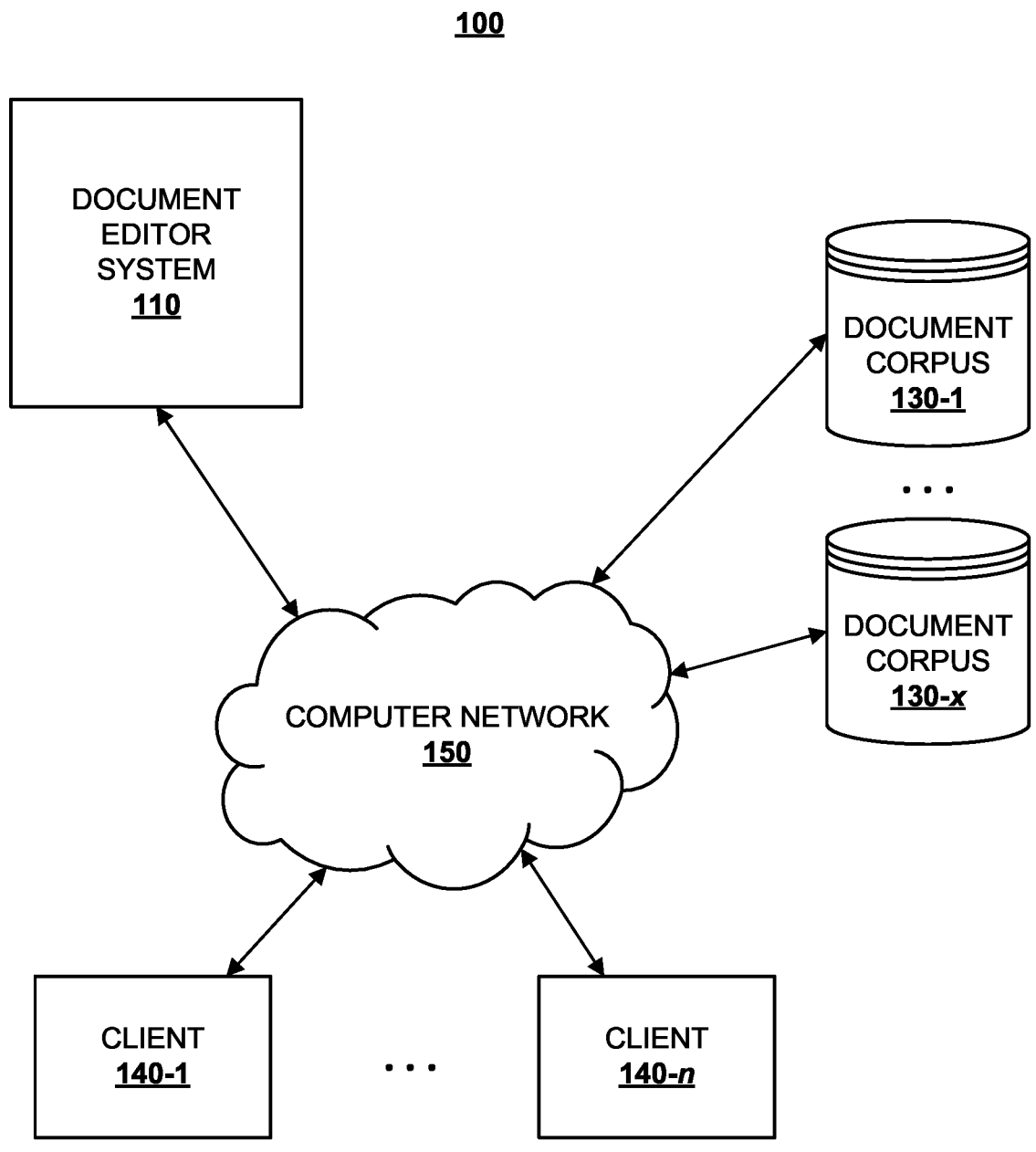
FIG. 1 schematically depicts an example environment in which selected aspects of the present disclosure may be implemented, in accordance with various implementations.

FIG. 1 schematically depicts an example environment 100 in which selected aspects of the present disclosure may be implemented, in accordance with various implementations. Any computing devices depicted in FIG. 1 or elsewhere in the figures may include logic such as one or more micro-processors (e.g., central processing units or "CPUs", graphi-cal processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a document editor system 110, may be implemented using one or more server computing devices that form what is some-times referred to as a "cloud infrastructure," although this is not required.

In implementations, the environment 100 may include a document editor system 110 that implements an online document editor application (e.g., a collaborative online text editor or word processor) that is accessible from various clients, including clients 140-1, . . . , 140-n that may be included in the environment 100, through either a thin client interface, such as a web browser (e.g., a web-based collab-orative online text editor application), or a program inter-face. In implementations, the online document editor appli-cation that is implemented by the document editor system 110 may be a software as a service (SaaS) document editor application. The document editor system 110 and the clients 140-1, . . . , 140-n may be in communication via a computer network 150, which may be any suitable network including any combination of a local area network (LAN), wide area network (WAN), or the Internet. The document editor sys-tem 110 may be configured to perform selected aspects of the present disclosure and/or to cause one or more of the clients 140-1, . . . , 140-n to perform selected aspects of the present disclosure in order to automatically split a table cell, responsive to a request from a user, in a table in a document that is created, modified, and/or viewed using one or more of the clients 140-1, . . . , 140-n.

Each of the clients 140-1, . . . , 140-n may be, for example, a user computing device that is used by a user to access a document editor application via a document editor applica-tion user interface, such as a SaaS document editor appli-cation, that is provided by the document editor system 110, e.g., through a web browser. In an example, the clients 140-1, . . . , 140-n may be user computing devices associated with an individual or an entity or organization such as a business (e.g., financial institute, bank, etc.), non-profit, club, university, government agency, or any other organiza-tion that uses a document editor application. For example, a business may operate a document editor application to create, modify, and/or view one or more documents to manage reports, proposals, financial records, business records, client lists, and so forth.

In various implementations, each of the clients 140-1, . . . , 140-n may include one or more user interface input devices such as a physical keyboard, a touch screen, and/or a microphone, to name a few. Additionally, each of the clients 140-1, . . . , 140-n may include one or more user interface output devices such as a display screen, a haptic feedback device, and/or speaker(s), to name a few.

In various implementations, the environment 100 may include document corpuses 130-1, . . . , 130-x that are accessible to the clients 140-1, . . . , 140-n via the computer network 150 or another network. Each of the document corpuses 130-1, . . . , 130-x may include multiple documents (e.g., text documents) created by one or more of the clients 140-1, . . . , 140-n, e.g., using the document editor system 110. In an example, the document corpuses 130-1, . . . , 130-x may include a set of documents created, edited, or viewed by users of one or more of the clients 140-1, . . . , 140-n associated with a particular entity or organization. Each of the documents stored in the document corpuses 130-1, . . . , 130-x may be associated with a set of permis-sions which may, as an example, define users and/or groups who have access to view and/or edit the document.

The document editor system 110 may be configured to provide (e.g., via a document editor application that displays a document editor application user interface on clients 140-1, . . . , 140-n) functionality for table cell splitting in documents that are created, modified, and/or viewed using one or more of the clients 140-1, . . . , 140-n. For example, the document editor system 110 may be configured to receive, from one of the clients 140-1, . . . , 140-n, user interface input that corresponds to a document in a docu-ment editing application. The document editor system 110 may be configured to automatically parse the received user interface input to identify a request to perform a cell splitting operation.

For example, the user interface input may include a single tap/click of a user (e.g., on an icon in the user interface, the icon being associated with a cell splitting operation) or may include two taps/clicks (e.g., a first tap/click may bring up a menu, and a second tap/click may select a menu item from the menu, the menu item being associated with a cell splitting operation). The user interface input received by the document editor system 110 from one of the clients 140-1, . . . , 140-n may identify a cell to split (e.g., based on a location of the click/tap, based on a cursor location, and/or based on additional input following or preceding the tap(s)/ click(s)) and may identify a number of vertical cells into which the cell is to be split and/or a number of horizontal cells into which the cell is to be split (e.g., based on additional input following or preceding the tap(s)/click(s)).

In response to receiving the user interface input, the document editor system 110 may determine a target number of rows and a target number of columns, automatically insert rows adjacent to rows of the cell to reach the target number of rows, automatically insert columns adjacent to columns of the cell to reach the target number of columns, and automatically merge groups of cells within an initial bound-ary of the cell, each group spanning a determined number of rows per group and a determined number of columns per group.

FIGS. 2A and 2B depict a flowchart illustrating an example method 200 of table cell splitting in an online document editor. For convenience, the operations of the method 200 are described with reference to a system that performs the operations. This system of method 200 includes one or more processors and/or other component(s) of various computer systems. Moreover, while operations of method 200 are shown in a particular order, this is not meant to be limiting. One or more operations may be reordered, omitted, or added.

At block 205, the system receives, via a user interface, a request to split a cell in a table in a document in a document editing application, the request identifying the cell, a number of vertical cells into which the cell is to be split, and a number of horizontal cells into which the cell is to be split. In some implementations, a document editing application (document editor) rendered by a web browser may be displayed on one or more of the user interface output devices of one of the clients 140-1, . . . , 140-n. The user may use one or more of the user interface input devices of one of the clients 140-1, . . . , 140-n to provide user interface input that is received by the document editing system 110. In some implementations, the user interface input may include a single tap/click of a user (e.g., on an icon in the user interface, the icon being associated with a cell splitting operation) or may include two taps/clicks (e.g., a first tap/click may bring up a menu, and a second tap/click may select a menu item from the menu, the menu item being associated with a cell splitting operation) that are indicative of a request to split a cell in a table. The user interface input received by the document editor system 110 from one of the clients 140-1, . . . , 140-n may identify a cell to split (e.g., based on a location of the click/tap, based on a cursor location, and/or based on additional input following or preceding the tap(s)/click(s)) and may identify a number of vertical cells into which the cell is to be split and/or a number of horizontal cells into which the cell is to be split (e.g., based on additional input following or preceding the tap(s)/click(s)).

At block 210, the system determines a target number of rows based on the number of vertical cells into which the cell is to be split and a row span of the cell. In some implementations, the document editor system 110 determines a target number of rows based on the number of vertical cells into which the cell is to be split (included in the request received at block 205) and a row span of the cell identified in the request received at block 205. In some implementations, determining the target number of rows may include determining a least common multiple of the number of vertical cells into which the cell is to be split and the row span of the cell.

At block 215, the system determines a target number of columns based on the number of horizontal cells into which the cell is to be split and a column span of the cell. In some implementations, the document editor system 110 determines a target number of columns based on the number of horizontal cells into which the cell is to be split (included in the request received at block 205) and a column span of the cell identified in the request received at block 205. In some implementations, determining the target number of columns may include determining a least common multiple of the number of horizontal cells into which the cell is to be split and the column span of the cell.

At block 220, the system identifies a plurality of affected cells including cells that span columns spanned by the cell and cells that span rows spanned by the cell. In some implementations, the document editor system 110 identifies, as the plurality of affected cells, each cell that spans one or more columns spanned by the cell identified in the request received at block 205 and each cell that spans one or more rows spanned by the cell identified in the request received at block 205. Affected cells may include normal cells (e.g., an unmerged cell) and head cells (e.g., a top left cell of a merged cell). For each affected cell that is identified, the document editor system 110 stores a row position of the affected cell, a column position of the affected cell, a row span of the affected cell, and a column span of the affected cell.

At block 225, for each row spanned by the cell, the system determines a height of the row, and for each column spanned by the cell, the system determines a width of the column. In some implementations, for each row spanned by the cell identified in the request received at block 205, the document editor system 110 determines a height of the row. For each column spanned by the cell identified in the request received at block 205, the document editor system 110 determines a width of the column.

At block 230, the system unmerges any head cells included in the plurality of affected cells. In some implementations, the document editor system 110 unmerges any head cells included in the plurality of affected cells identified at block 220.

At block 235, the system determines whether or not the cell is a head cell. In response to determining that the cell is a head cell, the system unmerges the cell and the flow proceeds to block 240. On the other hand, in response to determining that the cell is not a head cell, the flow proceeds to block 240 without performing an unmerging operation at block 235. In some implementations, the document editor system 110 determines whether or not the cell identified in the request received at block 205 is a head cell. In response to determining that the cell is a head cell, the document editor system 110 unmerges the cell and the flow proceeds to block 240. On the other hand, in response to determining that the cell is not a head cell, the flow proceeds to block 240 without the document editor system 110 performing an unmerging operation at block 235.

At block 240, the system determines a row factor by dividing the target number of rows by the row span of the cell. In some implementations, the document editor system 110 determines the row factor (e.g., an original-to-target row factor) by dividing the target number of rows determined at block 210 by the row span of the cell identified in the request received at block 205.

At block 245, for each row spanned by the cell, the system determines an updated row height by dividing a height of the row by the row factor, and then sets the height of the row based on the updated row height. In some implementations, for each row spanned by the cell identified in the request received at block 205, the document editor system 110 determines an updated row height by dividing a height of the row by the row factor determined at block 240, and then sets the height of the row based on the updated row height. In some implementations, if the updated row height falls below a minimum row height, the document editor system 110 sets the updated row height to the minimum row height. The minimum row height may be a predetermined minimum height, and/or may be dynamically determined, e.g., based on content in cells in the row.

At block 250, for each row spanned by the cell, the system automatically inserts, adjacent to the row, a number of rows that is one fewer than the row factor. In some implementations, for each row spanned by the cell identified in the request received at block 205, the document editor system 110 automatically inserts, adjacent to the row, a number of rows that is one fewer than the row factor determined at block 240.

Still referring to block 250, in some implementations, automatically inserting, adjacent to the row, the number of rows that is one fewer than the row factor includes automatically inserting, below the row, the number of rows that is one fewer than the row factor, using the row as a reference row. In some implementations, formatting of the reference row (e.g., typeface, text size, text color, text alignment, and/or background color, etc.) is applied to each of the rows that is automatically inserted adjacent to the row (e.g., based on the inserted row being inserted adjacent to the reference row, or by automatically copying the formatting of the reference row).

At block 255, the system determines a column factor by dividing the target number of columns by the column span of the cell. In some implementations, the document editor system 110 determines a column factor (e.g., an original-to-target column factor) by dividing the target number of columns determined at block 215 by the column span of the cell identified in the request received at block 205.

At block 260, for each column spanned by the cell, the system determines an updated column width by dividing a width of the column by the column factor, and then sets the width of the column based on the updated column width. In some implementations, for each column spanned by the cell identified in the request received at block 205, the document editor system 110 determines an updated column width by dividing a width of the column by the column factor determined at block 255, and then sets the width of the column based on the updated column width. In some implementations, if the updated column width falls below a minimum column width, the document editor system 110 sets the updated column width to the minimum column width. The minimum column width may be a predetermined minimum width, and/or may be dynamically determined, e.g., based on content in cells in the column.

At block 265, for each column spanned by the cell, the system automatically inserts, adjacent to the column, a number of columns that is one fewer than the column factor. In some implementations, for each column spanned by the cell identified in the request received at block 205, the document editor system 110 automatically inserts, adjacent to the column, a number of columns that is one fewer than the column factor determined at block 255.

Still referring to block 265, in some implementations, automatically inserting, adjacent to the column, the number of columns that is one fewer than the column factor includes automatically inserting, to a left of the column, the number of columns that is one fewer than the column factor, using the column as a reference column. In some implementations, formatting of the reference column (e.g., typeface, text size, text color, text alignment, and/or background color, etc.) is applied to each of the columns that is automatically inserted adjacent to the column (e.g., based on the inserted column being inserted adjacent to the reference column, or by automatically copying the formatting of the reference column).

At block 270, for each of the plurality of affected cells, the system determines a new row position of the affected cell and a new column position of the affected cell. In some implementations, for each of the plurality of affected cells identified at block 220, the document editor system 110 determines a new row position of the affected cell and a new column position of the affected cell. The new row position of the affected cell may be determined based on the original row position of the affected cell, stored at block 220, and the number of rows inserted at block 250. The new column position of the affected cell may be determined based on the original column position of the affected cell, stored at block 220, and the number of columns inserted at block 265.

At block 275, for each of the plurality of affected cells, the system determines a new row span of the affected cell and a new column span of the affected cell. In some implementations, for each of the plurality of affected cells identified at block 220, the document editor system 110 determines a new row span of the affected cell and a new column span of the affected cell. The new row span of the affected cell may be determined based on the original row span of the affected cell, stored at block 220, and the number of rows inserted at block 250. The new column span of the affected cell may be determined based on the original column span of the affected cell, stored at block 220, and the number of columns inserted at block 265.

Still referring to block 275, in some cases, the affected cell may not be fully contained inside of the rows spanned by the cell identified in the request received at block 205 and/or may not be fully contained inside of the columns spanned by the cell identified in the request received at block 205. Accordingly, in determining the new row span of the affected cell, a number of rows automatically inserted at block 250 for original rows that are also spanned by the affected cell may be used (e.g., added to the original row span of the affected cell to determine the new row span), while rows inserted at block 250 for original rows that are not spanned by the affected cell may be ignored. Likewise, in determining the new column span of the affected cell, a number of columns automatically inserted at block 265 for original columns that are also spanned by the affected cell may be used (e.g., added to the original column span of the affected cell to determine the new column span), while columns inserted at block 265 for original columns that are not spanned by the affected cell may be ignored.

At block 280, for each of the plurality of affected cells, in response to the new row span of the affected cell and/or the new column span of the affected cell being greater than one, the system merges cells in an area defined by the new row position of the affected cell, the new row span of the affected cell, the new column position of the affected cell, and the new column span of the affected cell. In some implementations, for each of the plurality of affected cells identified at block 220, in response to the new row span of the affected cell determined at block 275 and/or the new column span of the affected cell determined at block 275 being greater than one, the document editor system 110 merges cells in an area defined by the new row position of the affected cell determined at block 270, the new row span of the affected cell determined at block 275, the new column position of the affected cell determined at block 270, and the new column span of the affected cell determined at block 275.

At block 285, the system determines a number of rows per group by dividing the target number of rows by the number of vertical cells into which the cell is to be split. In some implementations, the document editor system 110 determines a number of rows per group by dividing the target number of rows determined at block 210 by the number of vertical cells into which the cell is to be split, identified in the request received at block 205.

At block 290, the system determines a number of columns per group by dividing the target number of columns by the number of horizontal cells into which the cell is to be split. In some implementations, the document editor system 110 determines a number of columns per group by dividing the target number of columns determined at block 215 by the number of vertical cells into which the cell is to be split, identified in the request received at block 205.

At block 295, the system automatically merges groups of cells within an initial boundary of the cell, each group spanning the determined number of rows per group and the determined number of columns per group. In some implementations, the document editor system 110 automatically merges groups of cells within an initial boundary of the cell identified in the request received at block 205, each group spanning the determined number of rows per group from block 285 and the determined number of columns per group from block 290. As a result of the merging, within an initial boundary of the cell identified in the request received at block 205, there is now a grid of merged cells, the dimensions of the grid being the number of vertical cells by the number of horizontal cells, identified in the request received at block 205.

FIGS. 3A, 3B, 3C, 3D, and 3E depict an example of splitting a cell in a table using an online document editor system 110 that causes a document editor to be displayed on one or more of the user interface output devices of one of the clients 140-1, . . . , 140-n. The scenario of FIGS. 3A, 3B, 3C, 3D, and 3E is for illustrative purposes only.

Figures 3A, 3B:
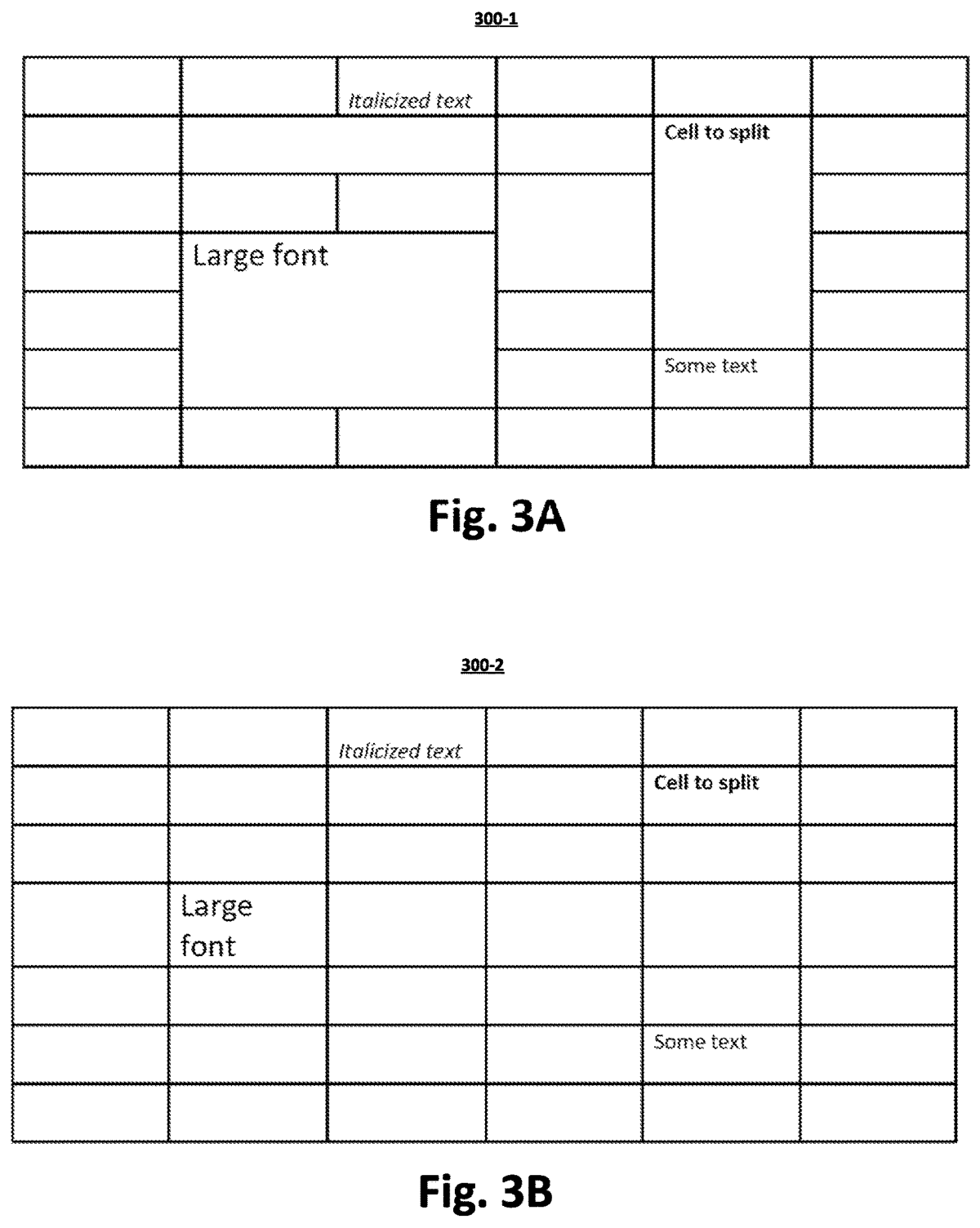

In the example of FIGS. 3A, 3B, 3C, 3D, and 3E, table 300-1, illustrated in FIG. 3A, is provided in which the cell that includes the text "Cell to split" is to be split into four cells. At block 205 of FIG. 2A, a request to split the cell is received, the request identifying the cell, a number of vertical cells into which the cells is to be split (2 cells), and a number of horizontal cells into which the cell is to be split (2 cells).

After unmerging any head cells included in the plurality of affected cells at block 230 of FIG. 2A and, in response to the determining that the cell to split is a head cell, unmerging the cell at block 235 of FIG. 2A, table 300-1 of FIG. 3A is transformed into table 300-2, illustrated in FIG. 3B. After automatically inserting rows at block 250 of FIG. 2B and automatically inserting columns at block 265 of FIG. 2B, table 300-2 of FIG. 3B is transformed into table 300-3, illustrated in FIG. 3C.

After re-merging the affected cells at block 280 of FIG. 2B, table 300-3 of FIG. 3C is transformed into table 300-4, illustrated in FIG. 3D. Finally, after merging the cell to split at block 295 of FIG. 2B, table 300-4 of Fig. D is transformed into table 300-5, illustrated in FIG. 3E. In table 300-5, the cell that includes the text "Cell to split" from table 300-1 in FIG. 3A has effectively been split into four cells through a series of insertion and merge operations.

Figure 4:
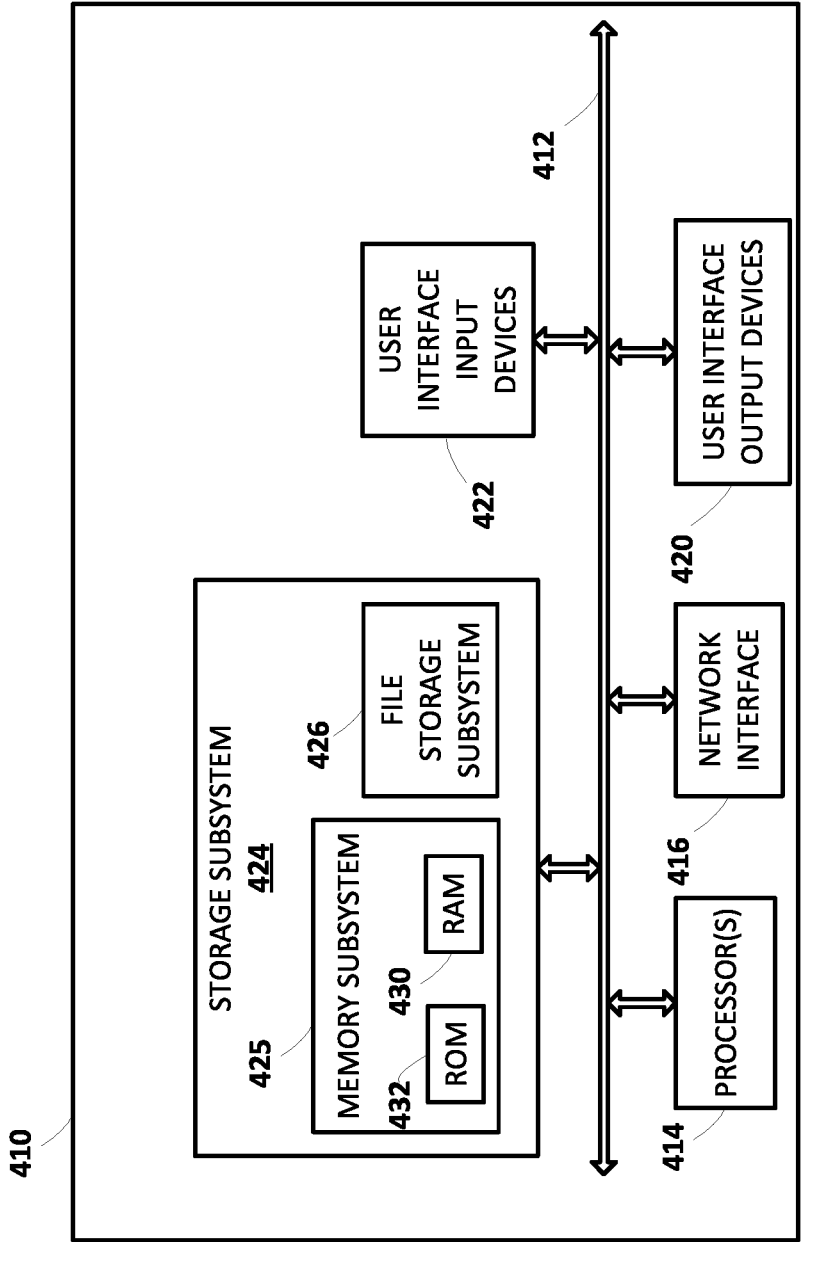
FIG. 4 illustrates an example architecture of a computing device.

FIG. 4 is a block diagram of an example computing device 410 that may optionally be utilized to perform one or more aspects of techniques described herein. Computing device 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computing device 410. Network interface subsystem 416 provides an interface to outside networks and is coupled to corresponding interface devices in other computing devices.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 410 to the user or to another machine or computing device.

Storage subsystem 424 stores programming and data constructs that provide the functionality of some or all of the modules described herein. For example, the storage subsystem 424 may include the logic to perform selected aspects of the method of FIGS. 2A and 2B, as well as to implement various components depicted in FIG. 1.

These software modules are generally executed by processor 414 alone or in combination with other processors. The memory subsystem 425 included in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computing device 410 communicate with each other as intended. Although bus subsystem 412 is shown schematically as a single bus, alternative implementations of the bus subsystem may use multiple busses.

Computing device 410 can be of varying types including a workstation, server, computing cluster, blade server, server farm, or any other data processing system or computing device. Due to the ever-changing nature of computers and networks, the description of computing device 410 depicted in FIG. 4 is intended only as a specific example for purposes of illustrating some implementations. Many other configurations of computing device 410 are possible having more or fewer components than the computing device depicted in FIG. 4.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, implemented by one or more processors, for splitting a cell in a table in a document in a document editing application, without utilizing new storage and layout primitives for split cells, and thereby using fewer processing resources than would be required by utilizing the new storage and layout primitives for the split cells, the method comprising:

receiving, via a user interface, a request to split the cell in the table in the document in the document editing application, the request identifying the cell, a number of vertical cells into which the cell is to be split, and a number of horizontal cells into which the cell is to be split;

determining a target number of rows based on the number of vertical cells into which the cell is to be split and a row span of the cell;

determining a target number of columns based on the number of horizontal cells into which the cell is to be split and a column span of the cell;

determining a row factor by dividing the target number of rows by the row span of the cell;

for each row spanned by the cell, automatically inserting, adjacent to the row, a number of rows that is one fewer than the row factor;

determining a column factor by dividing the target number of columns by the column span of the cell;

for each column spanned by the cell, automatically inserting, adjacent to the column, a number of columns that is one fewer than the column factor;

determining a number of rows per group by dividing the target number of rows by the number of vertical cells into which the cell is to be split;

determining a number of columns per group by dividing the target number of columns by the number of horizontal cells into which the cell is to be split; and automatically merging groups of cells within an initial boundary of the cell, each group spanning the determined number of rows per group and the determined number of columns per group.

2. The method according to claim 1, wherein:

determining the target number of rows comprises determining a least common multiple of the number of vertical cells into which the cell is to be split and the row span of the cell; and determining the target number of columns comprises determining a least common multiple of the number of horizontal cells into which the cell is to be split and the column span of the cell.

3. The method according to claim 1, wherein automatically inserting, adjacent to the row, the number of rows that is one fewer than the row factor comprises automatically inserting, below the row, the number of rows that is one fewer than the row factor, using the row as a reference row.

4. The method according to claim 1, wherein automatically inserting, adjacent to the column, the number of columns that is one fewer than the column factor comprises automatically inserting, to a left of the column, the number of columns that is one fewer than the column factor, using the column as a reference column.

5. The method according to claim 1, further comprising:

for each row spanned by the cell:

determining an updated row height by dividing a height of the row by the row factor; and setting the height of the row based on the updated row height, prior to automatically inserting, adjacent to the row, the number of rows that is one fewer than the row factor; and for each column spanned by the cell:

determining an updated column width by dividing a width of the column by the column factor; and setting the width of the column based on the updated column width, prior to automatically inserting, adjacent to the column, the number of columns that is one fewer than the column factor.

6. The method according to claim 1, further comprising:

determining that the cell is a head cell; and unmerging the cell, prior to automatically inserting the number of rows that is one fewer than the row factor and prior to automatically inserting the number of columns that is one fewer than the column factor.

7. The method according to claim 1, further comprising:

identifying a plurality of affected cells comprising cells that span columns spanned by the cell and cells that span rows spanned by the cell;

unmerging any head cells included in the plurality of affected cells, prior to automatically inserting the number of rows that is one fewer than the row factor and prior to automatically inserting the number of columns that is one fewer than the column factor;

for each of the plurality of affected cells:

determining a new row position of the affected cell and a new column position of the affected cell;

determining a new row span of the affected cell and a new column span of the affected cell; and in response to the new row span of the affected cell and/or the new column span of the affected cell being greater than one, merging cells in an area defined by the new row position of the affected cell, the new row span of the affected cell, the new column position of the affected cell, and the new column span of the affected cell.

8. A computer program product for splitting a cell in a table in a document in a document editing application, without utilizing new storage and layout primitives for split cells, and thereby using fewer processing resources than would be required by utilizing the new storage and layout primitives for the split cells, the computer program product comprising one or more non-transitory computer-readable storage media having program instructions collectively stored on the one or more computer-readable storage media, the program instructions executable to:

receive, via a user interface, a request to split the cell in the table in the document in the document editing application, the request identifying the cell, a number of vertical cells into which the cell is to be split, and a number of horizontal cells into which the cell is to be split;

determine a target number of rows based on the number of vertical cells into which the cell is to be split and a row span of the cell;

determine a target number of columns based on the number of horizontal cells into which the cell is to be split and a column span of the cell;

determine a row factor by dividing the target number of rows by the row span of the cell;

for each row spanned by the cell, automatically insert, adjacent to the row, a number of rows that is one fewer than the row factor;

determine a column factor by dividing the target number of columns by the column span of the cell;

for each column spanned by the cell, automatically insert, adjacent to the column, a number of columns that is one fewer than the column factor;

determine a number of rows per group by dividing the target number of rows by the number of vertical cells into which the cell is to be split;

determine a number of columns per group by dividing the target number of columns by the number of horizontal cells into which the cell is to be split; and automatically merge groups of cells within an initial boundary of the cell, each group spanning the determined number of rows per group and the determined number of columns per group.

9. The computer program product according to claim 8, wherein:

determining the target number of rows comprises determining a least common multiple of the number of vertical cells into which the cell is to be split and the row span of the cell; and determining the target number of columns comprises determining a least common multiple of the number of horizontal cells into which the cell is to be split and the column span of the cell.

10. The computer program product according to claim 8, wherein automatically inserting, adjacent to the row, the number of rows that is one fewer than the row factor comprises automatically inserting, below the row, the number of rows that is one fewer than the row factor, using the row as a reference row.

11. The computer program product according to claim 8, wherein automatically inserting, adjacent to the column, the number of columns that is one fewer than the column factor comprises automatically inserting, to a left of the column, the number of columns that is one fewer than the column factor, using the column as a reference column.

12. The computer program product according to claim 8, wherein the program instructions are further executable to:

for each row spanned by the cell:

determine an updated row height by dividing a height of the row by the row factor; and set the height of the row based on the updated row height, prior to automatically inserting, adjacent to the row, the number of rows that is one fewer than the row factor; and for each column spanned by the cell:

determine an updated column width by dividing a width of the column by the column factor; and set the width of the column based on the updated column width, prior to automatically inserting, adjacent to the column, the number of columns that is one fewer than the column factor.

13. The computer program product according to claim 8, wherein the program instructions are further executable to:

determine that the cell is a head cell; and unmerge the cell, prior to automatically inserting the number of rows that is one fewer than the row factor and prior to automatically inserting the number of columns that is one fewer than the column factor.

14. The computer program product according to claim 8, wherein the program instructions are further executable to:

identify a plurality of affected cells comprising cells that span columns spanned by the cell and cells that span rows spanned by the cell;

unmerge any head cells included in the plurality of affected cells, prior to automatically inserting the number of rows that is one fewer than the row factor and prior to automatically inserting the number of columns that is one fewer than the column factor;

for each of the plurality of affected cells:

determine a new row position of the affected cell and a new column position of the affected cell;

determine a new row span of the affected cell and a new column span of the affected cell; and in response to the new row span of the affected cell and/or the new column span of the affected cell being greater than one, merge cells in an area defined by the new row position of the affected cell, the new row span of the affected cell, the new column position of the affected cell, and the new column span of the affected cell.

15. A system for splitting a cell in a table in a document in a document editing application, without utilizing new storage and layout primitives for split cells, and thereby using fewer processing resources than would be required by utilizing the new storage and layout primitives for the split cells, the system comprising:

a processor, a computer-readable memory, one or more computer-readable storage media, and program instructions collectively stored on the one or more computer-readable storage media, the program instructions executable to:

receive, via a user interface, a request to split the cell in the table in the document in the document editing application, the request identifying the cell, a number of vertical cells into which the cell is to be split, and a number of horizontal cells into which the cell is to be split;

determine a target number of rows based on the number of vertical cells into which the cell is to be split and a row span of the cell;

determine a target number of columns based on the number of horizontal cells into which the cell is to be split and a column span of the cell;

determine a row factor by dividing the target number of rows by the row span of the cell;

for each row spanned by the cell, automatically insert, adjacent to the row, a number of rows that is one fewer than the row factor;

determine a column factor by dividing the target number of columns by the column span of the cell;

for each column spanned by the cell, automatically insert, adjacent to the column, a number of columns that is one fewer than the column factor;

determine a number of rows per group by dividing the target number of rows by the number of vertical cells into which the cell is to be split;

determine a number of columns per group by dividing the target number of columns by the number of horizontal cells into which the cell is to be split; and automatically merge groups of cells within an initial boundary of the cell, each group spanning the determined number of rows per group and the determined number of columns per group.

16. The system according to claim 15, wherein:

determining the target number of rows comprises determining a least common multiple of the number of vertical cells into which the cell is to be split and the row span of the cell; and determining the target number of columns comprises determining a least common multiple of the number of horizontal cells into which the cell is to be split and the column span of the cell.

17. The system according to claim 15, wherein automatically inserting, adjacent to the row, the number of rows that is one fewer than the row factor comprises automatically inserting, below the row, the number of rows that is one fewer than the row factor, using the row as a reference row.

18. The system according to claim 15, wherein automatically inserting, adjacent to the column, the number of columns that is one fewer than the column factor comprises automatically inserting, to a left of the column, the number of columns that is one fewer than the column factor, using the column as a reference column.

19. The system according to claim 15, wherein the program instructions are further executable to:

for each row spanned by the cell:

determine an updated row height by dividing a height of the row by the row factor; and set the height of the row based on the updated row height, prior to automatically inserting, adjacent to the row, the number of rows that is one fewer than the row factor; and for each column spanned by the cell:

determine an updated column width by dividing a width of the column by the column factor; and set the width of the column based on the updated column width, prior to automatically inserting, adjacent to the column, the number of columns that is one fewer than the column factor.

20. The system according to claim 15, wherein the program instructions are further executable to:

determine that the cell is a head cell; and unmerge the cell, prior to automatically inserting the number of rows that is one fewer than the row factor and prior to automatically inserting the number of columns that is one fewer than the column factor.

* * * * *